Oct. 2, 1956  H. J. DUDENHAUSEN  2,765,434
SPEED CONTROL FOR DIRECT CURRENT ELECTRIC MOTORS
Filed Oct. 16, 1951
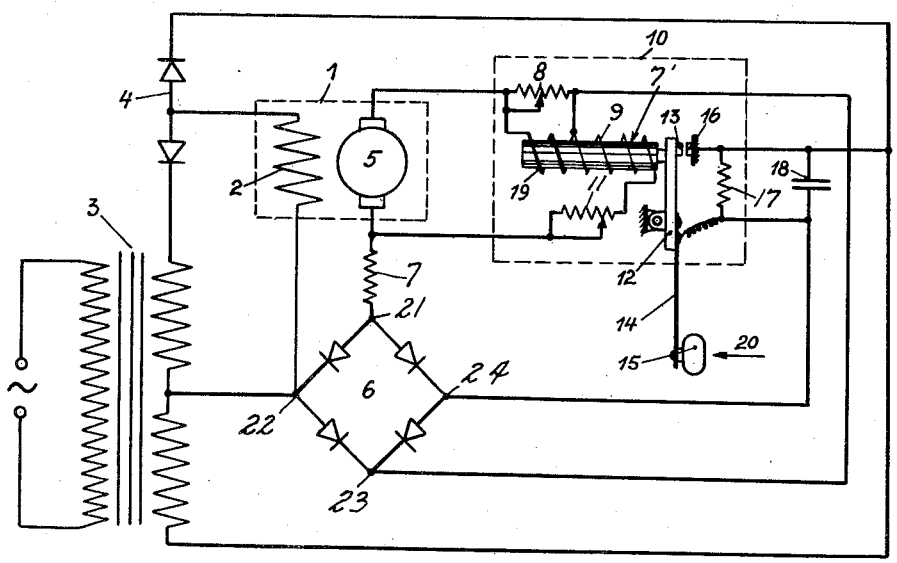
Inventor
Hans Jürgen Dudenhausen
By Flocks and Simon
Attorneys

United States Patent Office 2,765,434
Patented Oct. 2, 1956

2,765,434

SPEED CONTROL FOR DIRECT CURRENT ELECTRIC MOTORS

Hans Jürgen Dudenhausen, Vaucresson, France, assignor to Intavex, Inc., New York, N. Y., a corporation of New York Application October 16, 1951, Serial No. 251,525

Claims priority, application France October 16, 1950

5 Claims. (Cl. 318—331)

The present invention relates to speed regulators for direct current electric motors, the object of which is to regulate the rotational speed of such motors to a desired value and to reduce to a minimum variations of their speed about the desired value, in particular variations induced by changes in the mechanical load on such motors.

Speed regulators are known in which there is introduced into the armature circuit of the motor a vibrating contact the function of which, with an associated stationary contact, is periodically to switch a resistance into and out of the circuit. The contacts are urged to open under the influence of an electromagnet or relay energized by the counterelectromotive force of the motor and are urged to close under the opposing action of a spring, the adjustable tension of which is used to set the speed to which the motor is to be regulated.

The armature winding of the motor is thus traversed by current impulses of constant amplitude but of variable frequency and/or duration depending on the stress of the spring and on the mechanical load of the motor, which varies the counterelectromotive force thereof, as a result of which the rotational speed of the motor will be maintained at the desired value.

The known regulators of this type have serious drawbacks amongst which the following are three principal ones:

If, for any reason, the mechanical load of the motor increases in such a way that it forces the motor to stop, the winding of the armature will be burnt.

The ohmic voltage drop in the windings and in the commutation members of the motor produces an error in the energizing of the electromagnet which operates the vibrating contact, as a result of which the regulator effects an untrue speed regulation.

Since the vibrating and cooperating stationary contacts are traversed by direct current, they wear rapidly and in an asymmetrical manner, thus entailing untrustworthiness of operation of the regulator.

The present invention relates to improvements in regulators of this type which eliminate the above-mentioned drawbacks.

It is an object of the invention automatically to compensate the ohmic voltage drop in the windings and commutation members of the motor by providing the electromagnet which controls the vibrating contact with an additional winding connected in series with the armature of the motor and of such direction that its ampere-turns oppose the excitation due to the voltage at the terminals of the motor which acts on the normal reactive voltage winding of the electromagnet.

According to another feature of the invention the armature of the motor and both the usual and the additional windings of the relay which operate the vibrating contact are fed with direct current from the direct current output terminals of a bridge rectifier, while the vibrating and stationary contacts are connected in the alternating current circuit which supplies the bridge rectifier, as a result of which said contacts wear slowly and uniformly.

According to another feature of the invention there is added to the regulator an additional resistance with a high positive temperature coefficient, this additional resistance being connected in series with the armature of the motor. Due to this addition, the armature of the motor is efficiently protected whatever the mechanical load imposed on the motor.

The invention will be better understood from the description hereafter with reference to the accompanying drawings in which The single figure of drawings is a circuit diagram of a regulation device according to the invention.

Referring to the drawings, 1 designates a direct current motor the excitation of which is effected by means of a field winding 2 connected between the mid point of the secondary winding of a transformer 3 and the junction of a pair of oppositely poled rectifiers 4 connected across the entire secondary winding.

The armature 5 of the motor is fed from the output terminals 21 and 23 of a bridge rectifier 6, the alternating current input terminals 22 and 24 of which are connected between the mid point of the transformer secondary winding and one end terminal thereof through the contacts 13 and 16 of a speed regulator generally indicated at 10.

The regulator 10 comprises a relay generally indicated at 7' whose movable armature 12 is hinged at a fixed point (with respect to a stationary contact 16) and which carries a movable contact 13. Contact 13 is arranged opposite the stationary contact 16 and is urged against the latter by the tension of a spring 14. This tension may be varied by exerting a greater or lesser stress on the push button 15 in the direction of the arrow 20. The armature 12 is attracted, to open the contacts 13 and 16, by the winding 9 of the relay which is connected across the terminals of the armature 5 (except for a resistance 11 connected in series with the winding 9 to be discussed presently). A resistance 17, shunting the contacts 13 and 16, is so adjusted that the motor is on the point of starting when the contacts 13 and 16 are open. A condenser 18 attenuates sparking at the contacts and hence protects their contact surfaces.

The relay is provided with an additional winding 19 which is connected in series with the armature. Winding 19 is so oriented that its ampere-turns oppose the action of the winding 9, which may be referred to as a voltage winding. A resistance 8 is connected in parallel with the winding 19, and the function thereof together with that of the resistance 11 will be explained presently.

There may also be provided in series with the armature a resistance 7 having a high positive temperature coefficient, that is to say its ohmic value is low for normal currents through the armature, but it assumes a high value suitable to protection of the motor when the latter is overloaded.

The speed regulating device of the invention illustrated in the drawings operates as follows:

The resistance 17, through which the alternating current from the transformer secondary must pass to the input terminals 22 and 24 of rectifier 6, is periodically short-circuited by the contact 13 secured to the armature 12 of relay 7 and by the contact 16. The contact 13 of the relay is a make-contact, and is pressed against the contact 16 secured to the body of the relay only by means of a pressure exerted, for instance, by hand, on the knob 15 in the direction of the arrow 20, transmitted by the spring 14 to the armature 12, and the pressure with which the contacts 13 and 16 are pressed together is proportional to the pressure exerted on the knob 15.

With the contacts 13 and 16 open—which is always the case, as explained above when no pressure is exerted on the knob 15—the resistance 17 is set to such a value that the current flowing through the armature 5 is not quite sufficient to cause the starting of the motor 1.

If a pressure is now exerted on the knob 15, the contacts 13 and 16 close and the armature winding of the armature 5 is placed under full voltage, except for the desired voltage drop caused by the resistance 7 and the parallel combination of the resistance 8 and current winding 19 of the relay 10. The armature 5 of the motor 1 reaches a rotational speed which is proportional to the pressure exerted on the knob 15. The current winding 19 with its resistance 8 connected in parallel maintains the proportionality between the pressure on the knob 15 and the rotational speed of the motor 1 irrespective of the load torque on the motor. When, for example, a definite pressure on the knob 15 determines a proportional rotational speed of the motor 1, a very small mean current flows through the armature 5 and consequently also through the current winding 19 when the motor delivers no rotation torque. The ampere-turns in the current winding 19 oppose the ampere-turns in the voltage winding 9 very little in such a case. If, however, the motor 1 is loaded by a rotation torque, its rotational speed drops and, consequently, its counter-electromotive force, so that the armature current and consequently the current through the current winding increase; this decreases the ampere-turns in the voltage winding 9 still more. As a result, a higher voltage is applied to the armature 5 and the rotational speed of the motor 1 again approaches its desired value. The action of the current winding 19 with respect to the action of the voltage winding 9 may be so adjusted, by means of the resistance 8, that any desired rotational speed remains practically constant, irrespective of the load torque on the motor 1. The resistance 11 makes it possible to select the value of the maximum pressure on the knob 15 which is necessary to operate the motor 1 at its highest desired rotational speed. The higher the value to which the resistance 11 is set, the smaller is the maximum pressure to be exerted on the knob 15 to obtain the maximum rotational speed. When, by a small pressure on the knob 15, a small rotational speed of the motor 1 is selected, and when the motor is loaded with a high rotational torque, a higher current flows through the winding of armature 5 and through the contacts 13 and 16. Since however, alternating current is flowing through the contacts 13 and 16, no points or craters are formed on the contact surfaces, in spite of the high current load, so that the electrical and mechanical quality of the contacts is preserved.

In such a case, the resistance 7 protects the motor from a thermal overload, and makes it possible to obtain large effective powers from a small and light motor.

While the invention has been described in terms of a particular embodiment illustrated in the drawings, the scope of the invention is set forth in the appended claims. Various changes in the invention within the scope of those claims may be made from the embodiment shown in the drawings. For example, there is no necessity for the transformer 3 shown, nor is it necessary that the field winding of the motor be energized from a source having any particular relation to the alternating current source which energizes the rectifier for the armature circuit through the contacts controlled by the speed regulator of the invention.

I claim:

1. In combination, a shunt wound direct current electric motor, means to excite the field winding of said motor, a source of alternating current voltage, a rectifier supplying the armature of said motor, a relay, and a pair of normally closed contacts on said relay, said contacts being connected between said source and rectifier, said relay including a first winding connected in shunt with the armature of said motor, said first winding tending when energized to open said contacts, said relay further including a second winding connected in series with said armature, the fields of said first and second windings opposing each other.

2. In combination, a shunt wound direct current electric motor, a source of alternating current voltage, a bridge rectifier having input terminals connected to said source and output terminals connected to the armature circuit of said motor, a relay, a pair of contacts on said relay, said contacts being connected between said source and rectifier, a spring biasing said contacts to closed relation, and two windings on said relay, a first of said windings being connected in shunt with the armature of said motor and tending upon energization of said armature to open said contacts, the second of said windings being connected in series with said armature and developing, upon energization of said armature, a field in opposition to that developed by said first winding.

3. A regulated direct current motor for operation from an alternating current supply, said motor comprising field and armature members, a rectifier connected to supply said armature member from said supply, and a relay having a pair of normally closed contacts thereon, said contacts being connected between said supply and the input to said rectifier, said relay including a first winding connected in shunt with said armature member and tending upon energization of said armature member to open said contacts, said relay further including a second winding connected in series with said armature member and tending upon energization of said armature member to close said contacts.

4. A regulated direct current motor for operation from an alternating current supply, said motor comprising field and armature members, a rectifier connected to supply said armature member from said supply, the connection between said rectifier and supply including a resistance, and a relay having a pair of normally closed contacts thereon, said contacts being connected in shunt with said resistance, said relay including a first winding connected in shunt with said armature member and tending upon energization of said armature member to open said contacts, said relay further including a second winding connected in series with said armature member and tending upon energization of said armature member to close said contacts.

5. A regulated direct current motor for operation from an alternating current supply, said motor comprising field and armature members, a rectifier connected to supply said armature member from said supply, the connection between said rectifier and supply including a resistance, a relay having a pair of normally closed contacts thereon, said contacts being connected in shunt with said resistance, said relay including a first winding connected in shunt with said armature member and tending upon energization of said armature member to open said contacts, said relay further including a second winding connected in series with said armature member and tending upon energization of said armature member to close said contacts, a resistance in series with said first winding and a resistance in shunt with said second winding.

References Cited in the file of this patent

UNITED STATES PATENTS

| 2,162,237 | Avery | June 13, 1939 |
| 2,376,522 | Storm | May 22, 1945 |

FOREIGN PATENTS

| 371,084 | Great Britain | Apr. 21, 1932 |